June 17, 1930. W. P. VAN LAMMEREN 1,763,681
FEEDING MECHANISM FOR SLICING MACHINES
Filed Oct. 9, 1925 3 Sheets-Sheet 1
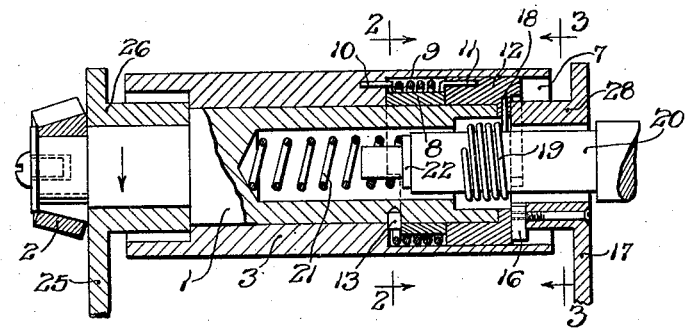
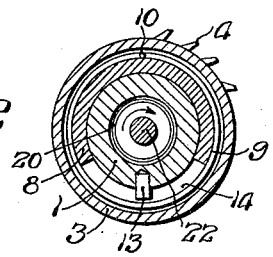
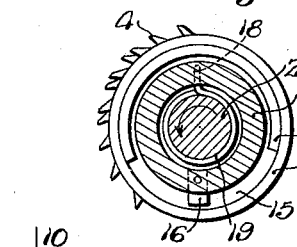
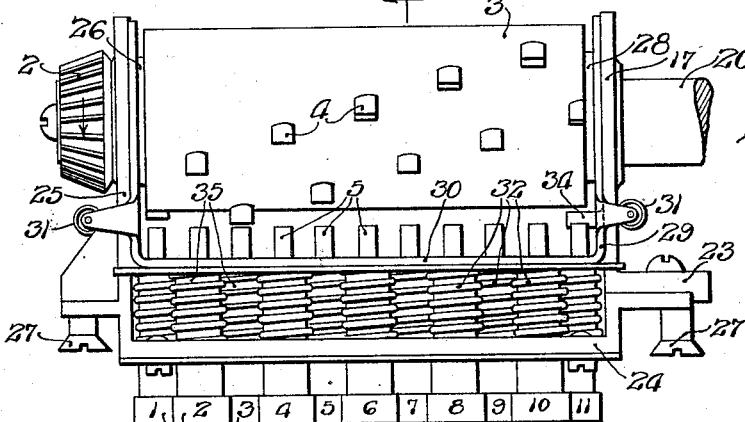
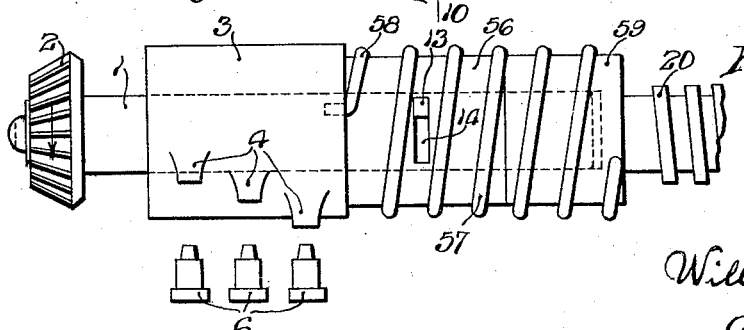
INVENTOR
Willem P. van Lammeren
BY Nissen & Crane
ATTYS.

June 17, 1930.  W. P. VAN LAMMEREN  1,763,681
FEEDING MECHANISM FOR SLICING MACHINES
Filed Oct. 9, 1925  3 Sheets-Sheet 2

INVENTOR
Willem P. van Lammeren
By Nissen & Crane
ATTYS

Patented June 17, 1930

1,763,681

UNITED STATES PATENT OFFICE

WILLEM PETRUS VAN LAMMEREN, OF ROTTERDAM, NETHERLANDS, ASSIGNOR TO U. S. SLICING MACHINE COMPANY, OF LA PORTE, INDIANA, A CORPORATION OF INDIANA

FEEDING MECHANISM FOR SLICING MACHINES

Application filed October 9, 1925, Serial No. 61,397, and in Denmark, Sweden, Hungary, Belgium, and Germany March 18, 1925.

The invention relates to a feeding mechanism for machines for slicing meat, bread and other materials.

In known slicing machines the feed is effected by means of a pawl mechanism actuating a screw spindle which displaces a nut segment attached to the support carrying the material to be sliced. This mechanism gives rise to shocks and makes much noise. According to the invention this drawback is removed by using a mechanism operating practically noiseless and being more effective than the known pawl mechanism, seeing that the latter, in particular when the machine is running at a high speed, does not always ensure the correct feed or the desired thickness of the slice.

According to the invention in a mechanism, transmitting the relative movement of a driving member to the main feed member, a spring coupling device is incorporated in such a manner that the feed is effected by a clamping action of the spring device and by the coupling of the main feed member with the driving work resulting therefrom, while the feed is terminated by releasing the clamping action of the spring device and by the uncoupling of the feeding member and driving member, resulting therefrom.

Consequently the invention is based on the property of springs, that these springs when being clamped around a cylindrical body by rotation of the latter in one direction, are taken along by the said body and reversely.

Within the spirit of the invention various embodiments are possible.

By using two oppositely wound helical springs the end of the feed can be regulated. In a simple manner this can also be obtained with one single spring, various embodiments being again possible. The beginning and the end of the feed may be regulated by using two helical springs which by the insertion of auxiliary elements in the mechanism automatically regulate the feed. This automatic regulation may be obtained by using adjustable members, which, according to the moment at which the positive action of the spring (s) terminates and, if desired, also to that at which the positive action thereof begins, may be adjusted from the exterior. By "positive action" the action is meant during which the feed is effected.

The above-mentioned adjustable members may form a part of a keyboard, each key of which co-operates with one of the projections of a sleeve in such a manner that by pressing in a key the other key is made inoperative automatically. Means may further be provided to prevent the feeding member from rotating so that no feed is effected in order to be able e. g. to grind and clean the knife easily.

The invention will be more fully understood with reference to the accompanying drawings, illustrating it by way of example:

Fig. 1 is a longitudinal section of a feeding mechanism according to the invention, the adjusting mechanism being omitted;

Fig. 2 is a cross-section according to the line 2—2 in Fig. 1;

Fig. 3 is a cross-section to the line 3—3 in Fig. 1;

Fig. 4 is an outer elevation of the same feeding mechanism, however, now provided with the adjusting mechanism and attachment means;

Fig. 8 shows an elevation of another improved feeding mechanism according to the invention.

All of these mechanisms serve for regulating the end of the feed, while

Figure 9:
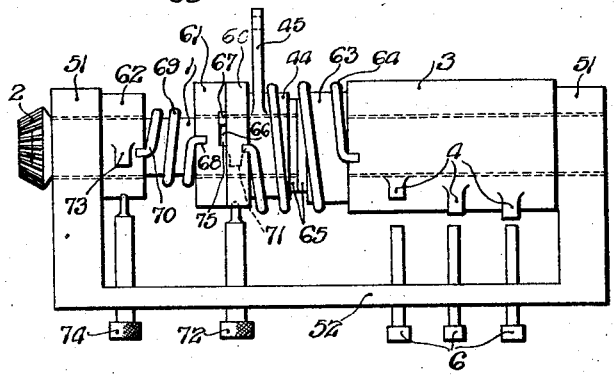
Figure 10:
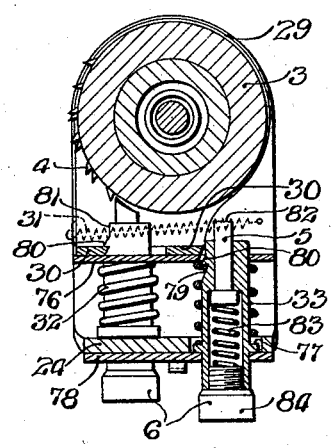

Fig. 9 shows a mechanism with which the beginning as well as the end of the feed may be regulated;

Fig. 10 is a cross-section according to the line 10—10 in Fig. 4; and

Figure 11:
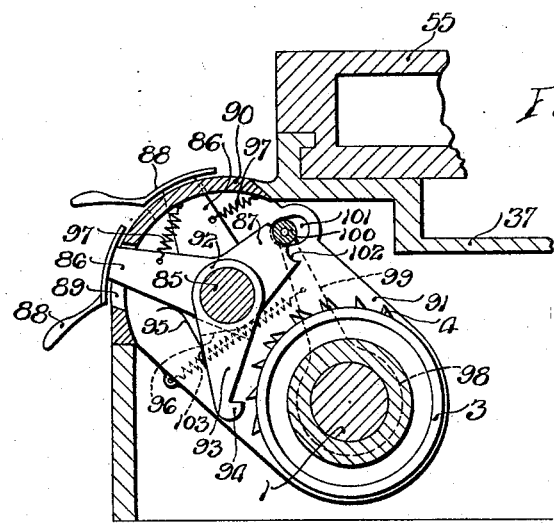

Fig. 11 shows a modified embodiment for limiting the stroke of the sleeve carrying the projections by means of another adjusting mechanism.

Figure 5:
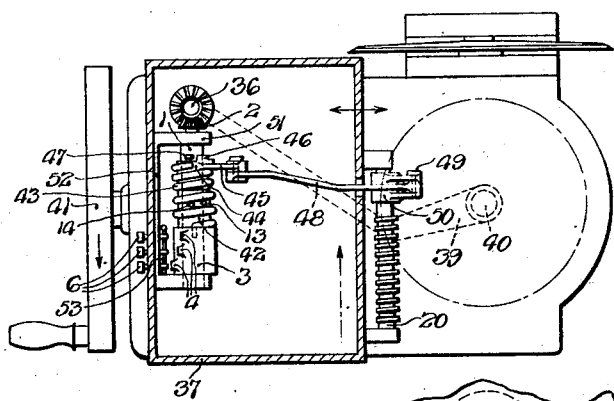
Fig. 5 is a horizontal section of a meat slicing machine having a modified and improved feeding mechanism according to the invention.
Figure 6:
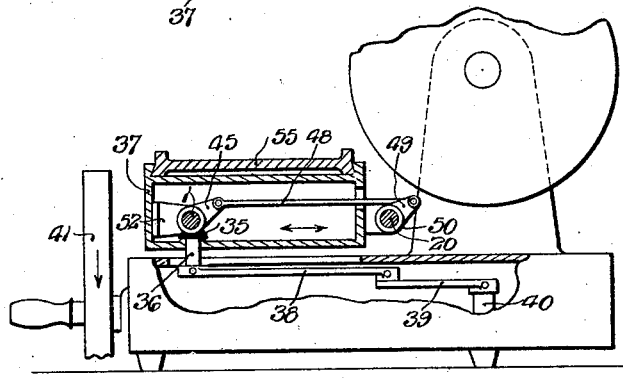
Fig. 6 is a vertical section of the same mechanism showing more clearly the driving means.

The feeding mechanism according to Figs. 1, 2 and 3 comprise a hollow shaft 1 to which by means of a gear wheel 2 a rocking movement is imparted, the direction of rotation at which the feed is effected being indicated by an arrow. The gear wheel 2 engages another gear wheel which, e. g. in the manner to be described with reference to Figs. 5 and 6, is driven from the operating mechanism for the slide or lower support or table. The construction of driving means is in general dependent upon the location of the feeding member. If, for instance, the feed screw is located beneath the meat table the gear 2 may be driven in the manner shown in Fig. 5 and the feed screw arranged in axial alinement with the shaft 1.

The hollow shaft 1 is surrounded by a sleeve 3 which is freely rotatable and provided with projections 4 co-operating with resilient abutments 5 which by means of corresponding spring actuated knobs 6 may be pressed into the path of the corresponding projections. This will be described more fully later on.

Within the sleeve 3 there is provided an annular chamber 7 receiving a ring 8 freely rotatable about the hollow shaft 1 around which ring a left-handed helically wound spring 9 is wound tightly, the end 10 of which engages a hole of the sleeve 3 while the other end 11 engages a hole of a freely rotatable ring 12. The hollow shaft is provided with a projection 13 which if rotated moves within a recess 14 of the ring 8. The ring 12 has a corresponding recess 15 so that it can perform a certain rotation which is limited by a stationary projection 16 of a bracket 17.

To the ring 12 the end 18 of a helical spring 19 is connected which is wound tightly around the feeding screw spindle 20 and is wound right-handed. The said spindle is held fast against a rotation in one direction by a right helical spring 21 pressing against the hollow shaft at one end and with the insertion of a pressing member 22 pressing against the spindle at the other end.

The bracket 17 has a flange 23 connecting it to a bridge piece 24 integral with a second bracket 25 provided with a sleeve 26 forming a bearing for one end of the hollow shaft 1. The whole may be attached to a slicing machine by means of screws 27. Around the hub portion or sleeve 28 of the bracket 17 and the sleeve 26 of the bracket 25 a member 29 is rotatable, having a cross piece 30 for each of the two rows of knobs 6 and being pressed by helical springs 31 against the said knobs.

By pressing in one of the knobs 6 the corresponding pin 5 which is beveled at the rear side is shifted into the path of a projection 4 thereby compressing the knob spring 32 surrounding a sleeve 33 (Fig. 10). This spring presses with one end against the cross piece 76 embedded with its ends in the brackets 17 and 25 and with its other end against a collar 77 of the sleeve 33. This collar 77 rests against a closing plate 78 screwed against the bridge piece 24. The sleeve 33 which has been taken along is held fast by pawl action; the bridge piece 30, namely, is pulled to the right by the tension springs 31 (Fig. 10), whereby its right leg engages a recess 79 of the sleeve 33 so that the spring 32 cannot move back the said sleeve. This can only be effected when another key is pressed in whereby an inclined portion 80 of the other sleeve presses the entire bridge piece 30 to the left (Fig. 10). The adjustment once being effected, then the bridge piece comes to bear against the flat surface 81 at the free end of the sleeve 33. The portion 30 is consequently released from an annularly acting pressure.

In order to allow for adjustment when the machine is running, the square spindles 5 are provided with an inclined surface 82 and are actuated by a helical spring 83 pressing at the other end against a screwed-in plug 84. The upper row in Fig. 4 comprises the keys 2–10, the lower row the keys 1–11. The operation of the adjusting means now being known, the other mechanism will now be described.

At the beginning of the rotation of the hollow shaft 1 the latter rotates freely without influencing any part. After a certain rotation the projection 13 of the shaft 1 engages the one extremity of the recess 14 and the ring 8 is then taken along by the shaft. Consequently the tightly wound spring 9 which is clamped around the ring 8 is taken along in tensioned condition and consequently also the sleeve 3, until one of the projections 4 abuts against the corresponding projecting pin 5 of one of the keys 6. During this movement the feed is effected from the moment at which the sleeve 3 was taken along till the moment at which the corresponding projection 4 of the sleeve engages the corresponding key pin.

The ring 12, namely, is meanwhile taken along by the helical spring 9 and consequently also the helical spring 19 connected to the said ring. With a view to the fact that this spring is wound right-handed the spring grips the screw spindle 20 and it is rotated to cause the feeding movement. The spring 9 is clamped sufficiently tight around the ring 8 so that there is enough frictional contact between the spring 9 and ring 8 to cause the spring to rotate with the ring 8 against the resistance offered by the winding of the spring 19 which is connected to the spring 9 through the ring 12. In addition, the spring 9 is wound in a left hand direction around the ring 8 and since the point of application of the resistance to rotation of the spring 9 is applied at the right hand end of this spring, shown at 11 in Fig. 1, the spring 9 increases its grip around the ring 8 when the ring 8 is rotated in the direction indicated by the arrows in Figs. 1 to 3. The frictional contact between the spring 9 and ring 8 therefore increases as the resistance of the spring increases because of the winding of the spring 19. The ring 8, spring 9, sleeve 3 and ring 12, therefore, rotate as a unit.

Now, as soon as the sleeve 3 is held fast in the manner described, the spring 9 does not act any longer to carry along the ring 12 because the sleeve 3 being held rigidly stationary, the ring 8 is forced to overcome the frictional contact with the spring 9 and, in addition, the frictional contact between the spring 9 and ring 8 is relieved because the point of application of the resistance to rotation of the spring 9 is now at the left hand side of this left hand wound spring 9 and the ring 8 merely rotates within the spring coils 9. It will be seen therefore that the ring 8 and spring 9 constitute co-operating clutch members and whether or not the spring 9 is driven by the ring 8 depends upon whether the resistance is applied to the right or left end of the spring 9.

As soon as the direction of rotation of the shaft 1 is altered the projection 13 again performs its free stroke within the recess of the ring 8, the latter being taken along also during the backward motion. Due to the friction between the spring 9 and the ring 8, the sleeve 3 and the ring 12 with the spring 19 are also moved and the spring 19 now being distended does not take along the screw spindle. Now when the projection 16 abuts against the radial abutting surface of the ring 12 the movement of all the parts of the feeding mechanism, with the exception of the hollow shaft, is stopped so that these parts are always moved back in the original position. By rotating back the hollow shaft, which may be moved back still further without influencing the screw spindle, the latter is still extra locked against rotation by the spring 21 in the hollow shaft so that a negative feed is prevented.

In order to avoid that, e. g., when applying the above-described mechanism to a slicing machine, the springs are distorted or injured, the stationary bracket 17 is provided with a safety projection 34 in the path of the projection 4 of the sleeve 3 for the largest thickness of slice so that the sleeve 3 cannot be taken along by the hollow shaft 1 any further, which is in particular important in case the angular displacement of the said shaft is considerably larger than corresponds with the largest thickness of slice.

As shown in Fig. 4, when driving the machine, a feeding movement of the meat table would always be obtained. According to the invention this may be avoided by arranging an abutment immediately in front of the first projection 4 or by an additional projection on the sleeve 3 so that by pressing in the knob corresponding to the said additional projection all the remaining knobs are made inoperative, while the said additional knobs prevent the sleeve 3 from being rotated. This locking action may be released immediately by pressing in one of the knobs 6 for adjusting the thickness of slice. Each knob pressed gives a different amount of feed to the feed screw 20 and consequently adjusts the thickness of the slice being cut.

It is further noted that only by pressing in a single knob the slice thickness is either immediately increased or decreased, or the feed of the material is entirely stopped, it being unnecessary to stop the machine to accomplish this result.

The rocking movement of the hollow shaft 1 may also be obtained by providing this shaft with a projection which during the movement of the slide carrying the feeding mechanism runs against an abutment and is rotated thereby to a certain degree; a spring may effect the return movement. The invention is, however, not limited to these two embodiments.

In Figs. 5 and 6 it is shown how in another embodiment the shaft 1 may be driven in a simple and effective manner. The gear wheel 2 is permanently engaging a larger gear wheel 35 mounted on a pin 36 which is freely rotatable in the slide 37 of the machine and is rigidly connected to a connecting rod 38 pivotally connected to a crank 39 mounted on a shaft 40 driven by a transmission, not shown, from the fly wheel 41. The shaft 1 which is here solid and may therefore be thinner is provided with a circumferential projection 13 engaging with some clearance a corresponding recess or slot 14 of a ring 42. This ring is mounted for free rotation on the shaft 1 and a portion of a right-handed helical spring 43 is clamped around the said ring and attached in the sleeve 3. The other portion of the said spring is tightly wound around the hub 44 of a crank 45 carrying a projection 46 co-operating with the projection 47 of the shaft 1. The crank 45 is pivotally connected by means of a rod 48 to a crank 49 of a hub 50 coupled by a spring or free wheel coupling to the screw spindle 20 in such a manner that this spindle when the rod 48 reciprocates, rotates so as to carry the slide table 55 in the direction of the arrow by well-known connections (not shown).

Figure 7:
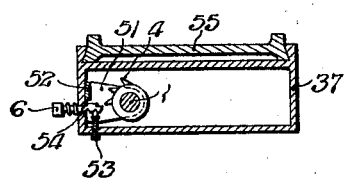
Fig. 7 is a vertical section of a portion of the machine according to Fig. 5 with the adjusting mechanism.

The shaft 1 is journaled in lugs 51 of a bridge piece 52. Each knob or key 6 may by a pressing action be brought in the path of one of the projections 4 of the sleeve 3 whereby a common resilient member 53 snaps into one of two recesses of either of the key pin 54, thus locking the adjusted key while the other key under the influence of its own spring moves back in the original position (Fig. 7). The member 53 is always forced upwardly by helical springs.

The operation of the mechanism described (Figs. 5, 6 and 7) is as follows:

When rotating the shaft 1 to the left as seen in Fig. 5 the projection 47 of the shaft 1 moves away from the projection 46 of the hub. However, the other projection 13 when abutting against the one end of the recess 14 of the ring 42 takes the latter along thereby tensioning the spring 43, which spring then takes along the hub 44 with crank 45 as well as the sleeve 3 until the latter is held fast by the pressed-in key. At this moment the feed is terminated, which feed began at the moment at which the spring took along the hub 44. The shaft 1 can then revolve still further in the same direction without increasing the feed as the spring 43 is held stationary by sleeve 3.

During the return rotation of the shaft 1 the projection 13 performs again its free stroke and once being arrived at the other end of the recess 14 moves back the parts in the original position. Should the frictional force be insufficient to move back the hub with the crank and the further rod system due to lack of friction between spring 43 and hub 44 or for any other reason, then the projection 47 by taking along the projection 46 of the hub insures that the full adjusted feed is obtained on the next stroke.

During the feeding movement the meat support 55 (Fig. 6) moves in the direction of the dash-dotted arrow in Fig. 5, that is to say, toward the knife. The movement of the slide 37 is indicated by the double arrow; consequently it moves along the knife, its stroke being determined by the crank 39 which is connected to the pin 36 of the slide by means of the rod 38.

The mechanism according to Figs. 5, 6 and 7 is more simple than that according to Figs. 1, 2 and 3.

A still more simple mechanism is shown in Fig. 8.

Just as in the construction already described, the sleeve 3 is freely rotatable about the shaft 1. The projection 13 of the shaft engages a recess 14 of a ring 56 which for the rest is also freely rotatable about the shaft and around which is tightly wound the largest portion of the windings of a left-handed helical spring 57 connected with its one end 58 to the sleeve 3 and being clamped with its remaining windings around a thickened portion 59 of the screw spindle 20, which portion is cup-shaped and embraces freely rotatably the end of the shaft 1.

If in this mechanism the shaft is moved in the direction of the arrow, the sleeve 56 is taken along as soon as the projection 13 has performed its free stroke within the recess 14 and consequently the helical spring and the screw spindle 20, the portion 59 of which is engaged by the spring are also taken along. This portion 59 is taken along until one of the projections 4 abuts against the pin of the pressed-in key whereby the end of the feed is determined. During the return rotation of the shaft 1 the operation is similar to that described with reference to the former mechanism, during which rotation a portion of the springs slides over the thickened portion 59 without taking along the screw spindle. This spindle may be provided at the other end with a friction clutch in order to be certain that the screw spindle does not rotate in a reverse direction.

With all these mechanisms the end of the feed may be regulated at will whereby at the same time the thickness of the slices is altered, and the machine need not be stopped. In order to regulate the beginning as well as the end of the feed the construction according to Fig. 9 may be used, which seems to be somewhat more complicated, but has important advantages. With this mechanism it is possible to shift the entire period of feed with respect to the slide movement.

On the shaft 1 in Fig. 9 are mounted freely rotatable (indicated enlarged by two parallel dotted lines) a sleeve 3, a hub 44 with crank 45, a ring 60, a taking-along ring 61, co-operating therewith and a third ring 62. The keys co-operating with the sleeve 3 are schematically indicated by 6.

The shaft 1 has a thickened portion or collar 63 around which is tightly wound a portion of a right-handed helical spring 64, the one end of which is connected to the sleeve 3 and the other end being hooked to the ring 60; the other portion of the said spring closely fits around the hub 44. The ends of the thickened portion 63 and the hub facing each other are of smaller diameter at 65 for the purpose to be described later on.

The taking-along ring 61 is provided with a circumferential groove 66 which is engaged by a projection 67 of the first ring 60 and receives the one end of a left-handed helical spring 69 tightly wound on shaft 1, the other end 70 of which is connected to the third ring 62.

The first ring 60 is further provided with a circumferential projection 71 cooperating with an adjustable stop 72, while the third ring 62 is provided with an oppositely directed projection 73 co-operating with an adjustable stop 74 for regulating the beginning of the feed. The ring 62 may also be provided with a plurality of projections and may co-operate with a slidable pin constructed in a similar manner those used with the projections on the sleeve 3.

The beginning of the feed is determined by the relative position of the projection 73 and the stop 74, while the end of the feed is determined by the projections 4 and the keys 6. The operation of this mechanism is as follows:

During the rotation of the shaft 1 in the direction of the arrow the spring 69 is taken along and thereby pushes forward the rings 61 and 62. The left end of the spring 64 is also pushed forward and although this spring, for the reason that it is clamped around the collar 63 of the shaft 1 is tensioned, it slides along the hub 44 without taking it along. The spring 64 is prevented from doing this because at 65 there is some clearance.

As soon as the projection of the third ring 62 abuts against the stop 74 the thickened portion 63 takes along the spring 64 as well as the hub 44 and crank 45 since the spring 64 now tightly grips the portion 63 and hub 44 whereby the feed is started. The first ring 60 rotates also until the projection 67 comes into contact with the surface 75 of the recess of the taking-along ring 61, unless one of the projections 4 of the sleeve 3 has been held fast earlier. The contact between the projection 67 and the surface 75 is resilient so that shocks and wear are avoided. If one of the projections 4 of the sleeve 3 comes into contact with the corresponding adjusting knob 6, the right end of the spring 64 is held fast and this spring is distended, whereby the hub 44 with crank 45 are no further taken along by the shaft 1. The shaft 1 may, if desired, rotate further without affecting any feed. Now, if the direction of rotation of the shaft changes, the two helical springs 64 and 69 are taken along by reason of the frictional contact between spring 69 and the shaft, in which movement the crank 45 on the hub 44 participates until the projection 71 abuts against the stop 72, whereby the original position of the crank is determined. The sleeve 3 is meanwhile turned back as well as the spring 69 and the third ring 62.

The projection 67 may be arranged on the taking-along ring 61 instead of on the first ring 60 and co-operate with a correspondingly located stop on the ring 60, the surface 75 taking back the projection 67 and thereby ensuring that all parts are always brought back into the same original position.

As regards the coupling of the feeding mechanism according to the invention to the machine and the screw spindle, it will be noted that this may be effected in various ways. The feed may take place at the forward or backward movement of the slide, or at the reversal of the direction of motion of the slide, that is to say, during a portion of the forward end of the backward stroke of the slide.

With the new mechanism a feed is obtained which is practically noiseless. The mechanism may be used in connection with various types of slicing machines. It may be used in machines having a reciprocating or swinging slide and a stationary knife, and also in machines having a stationary slide and a reciprocating or rotary knife.

Where there is question in the above about a screw spindle, the screw spindle has been meant which normally engages a nut segment attached to the part of the machine adapted to feed the material toward the knife. Instead of a screw spindle with nut segment, a cable with a pair of tongs or a clamp as main feeding member might also be used.

The stopping of the sleeve 3 may also be effected otherwise than illustrated, e. g. by a single step which is slidable transversely in an inclined or helically arranged groove into the path of each of the projections of the said sleeve. The sleeve with projections could also be omitted and the end of the springs be stopped by an adjustable stop or by one of a series of stops located in a plane perpendicular to the center line of the shaft of the spring coupling without departing from the spirit of the invention.

Further the adjusting means described of the feeding mechanism may be substituted by the following adjusting means shown in Fig. 11, in which another location has been chosen for the sleeve with projections and accessories, namely, in an inner corner of the slide 37 carrying the meat support 55.

Parallel to the shaft 1 an adjusting shaft 85 is supported on which are mounted freely rotatable as many bell crank levers 86, 87, as the sleeve 3 has projections 4. Each lever arm 86 carries an adjusting key 88 and is movable in a slot 89 of a key piece 90 having supporting brackets 91 for the shaft 1 and accessories. At either side of each bell crank lever the one fork-shaped end 92 of an arm 93 is freely rotatably mounted on the adjusting shaft 85, the other bent end 94 of the said arm being adapted to move into the path of a projection 4 of the sleeve 3. A leaf spring 95 always tends to move the end 94 away from the key 88, a broken surface 96 between the legs of the fork serving as a limitation of the relative movement between the bell crank lever end of the said arm.

In order to retain the bell crank lever in the adjusted position and at the same time to obtain the already previously mentioned advantage of the automatic return movement, each bell crank lever is pulled by its own spring 97 always into the inoperative position shown. In the brackets 91 are journaled the hubs 98 of the two arms 99 together carrying a locking bolt 100, which is movable in slots 101 in the stationary brackets 91 and engaging one of the two recesses 102 of each bell crank lever 87. A spring 103 pulls the locking bolt 100 always toward the adjusting shaft 85. The operation of this mechanism will be clear from the foregoing.

I claim:—

1. In combination, a driving and a driven element, a helical spring attached to one of said elements and wound upon the other to transmit motion between said elements, and a stop adapted to occupy a predetermined position for engaging said spring to distend said spring and break the driving connection between said elements.

2. A motion transmitting device comprising a rotatable member, a helical spring wound upon said member and frictionally engaging the same, a second member connected with one end of said spring and operatively connected with said rotatable member by said spring, and a stop adapted to occupy a predetermined position for holding the opposite end of said spring against rotation and to release said spring from said rotatable member and break the driving connection between said spring and rotatable member.

3. In combination, a driving and a driven member, a helical spring attached to one of said members and frictionally wound upon the other for transmitting motion between said members, a stop carrier attached to one end of said spring and freely rotatable during the driving connection between said members, and a stop for arresting said stop carrier at a predetermined position to release said spring and break the driving connection between said members.

4. In combination, a driving member, a helical spring wound upon said member and frictionally engaging the same, a driven member connected with one end of said spring, and means for arresting the rotation of the other end of said spring to distend said spring and break the frictional connection between said spring and driving member.

5. In combination, a rotatable driver, a helical spring wound upon said driver and frictionally engaging the same, a driven member connected with the trailing end of said spring and freely rotatable, a stop carrier connected with the advancing end of said spring, and a stop for engaging said stop carrier to arrest the advancing end of said spring and break the frictional connection between said spring and rotatable driver.

6. In combination, a rotatable driver, a spring frictionally engaging said driver and driven by said frictional engagement, a driven member connected with said spring and rotated thereby when said driver is rotated in one direction, means for actuating said driver, and a lost motion connection between said driver and actuating means.

7. In combination, an oscillating member, a driver actuated by said oscillating member and having lost motion connection therewith, a helical spring wound upon said driver and frictionally engaging the same, a driven member connected with the trailing end of said helical spring, a stop carrier connected with the advancing end of said helical spring, and means for arresting the movement of said stop carrier at different predetermined positions thereof to distend said helical spring and break the driving connection between said driver and driven member.

8. In combination, an oscillating member, a driver actuated by said oscillating member, a helical spring wound upon said driver and frictionally engaging the same, a driven member connected with the trailing end of said spring, and a stop for arresting the advancing end of said spring to distend said spring and break the driving connection between said driver and driven member.

9. In combination, an oscillating member, a driver, lost motion connection between said oscillating member and driver, a helical spring wound upon said driver and frictionally engaging the same, a driven member connected with the trailing end of said spring when said oscillating member moves in one direction, a stop carrier connected with the advancing end of said spring when said oscillating member is moving in said one direction, and a stop for arresting said stop carrier at a predetermined point in the movement thereof to distend said spring and break the driving connection between said driver and driven member, said spring operating to restore said stop carrier to its initial position upon reverse movement of said oscillating member.

10. In combination, an oscillating member, a driver actuated by said oscillating member, a lost motion connection between said oscillating member and driver, a helical spring wound upon said driver and frictionally engaging the same, a sleeve having a plurality of stops thereon connected with the end of said spring which is advanced when said oscillating member moves in one direction, an intermediate member connected with the opposite end of said spring, a second helical spring connected with said intermediate member, a driven spindle upon which said second helical spring is wound to cause rotation of said spindle when said oscillating member moves in said one direction, and stops for arresting said stop sleeve at different predetermined positions in the movement thereof to break the driving connection between said driving and intermediate members, said driving member operating through said first-mentioned spring to restore said stop sleeve to its initial position upon reverse movement of said oscillating member.

11. In combination, an oscillating spindle, a stop sleeve freely rotatable on said spindle, a driving sleeve having lost motion connection with said spindle, a driven member freely rotatable on said spindle, a helical spring having one end attached to said stop sleeve, said spring being frictionally wound upon said driving sleeve and driven member to constrain said driven member to rotate in unison with said driving sleeve when said oscillating member moves in one direction but permitting said driving sleeve to move in the opposite direction independently of said driven member, and stops for arresting the movement of said stop carrying sleeve at predetermined positions thereof to distend said spring and break the driving connection between said driving sleeve and driven member.

12. In combination, an oscillating member, a driven member actuated thereby, means for transmitting movement from said oscillating member to said driven member during one direction of rotation of said oscillating member, and controlling devices for said transmitting means for determining the point in the movement of said oscillating member at which the action of said transmitting means begins and stops.

13. In combination, an oscillating driver, a driven member, mechanism for transmitting movement from said driver to said driven member and for controlling the period of connection between said driver and driven member, said mechanism including a pair of helical springs, and a pair of stops for controlling said springs to determine the beginning and end of the driving connection between said oscillating member and driven member.

14. In combination, an oscillating shaft, a collar rotatably mounted on said shaft, means for connecting a driven member with said collar, a pair of stop carriers rotatably mounted on said shaft, helical springs oppositely wound upon said shaft and having one end of each connected with said stop carriers respectively, a pair of rings rotatably mounted upon said shaft and connected with the opposite ends of said helical springs respectively, lost motion connection between said springs, one of said helical springs being wound upon said collar and acting to transmit movement from said shaft to said collar when said shaft is rotated in one direction, means for engaging one of said stop carriers to permit driving connection between said spring and collar, and means for engaging the other of said stop carriers to break the driving connection between said spring and collar.

15. In combination, co-axial rotary driving and driven members, a stop device having limited rotary movement on said driving member, and a flexible member helically wound upon said driving and driven members and having the advancing end thereof attached to said stop device and having the trailing end thereof frictionally engaging the driven member.

In testimony whereof I have signed my name to this specification on this 21st day of September, 1925.

WILLEM PETRUS van LAMMEREN.